US007858929B2

(12) United States Patent
Makarov et al.

(10) Patent No.: US 7,858,929 B2
(45) Date of Patent: Dec. 28, 2010

(54) ION ENERGY SPREAD REDUCTION FOR MASS SPECTROMETER

(75) Inventors: Alexander Makarov, Cheadle Hulme (GB); Mikhail Monastyrskiy, Moscow (RU); Dimitry E. Grinfield, Moscow (RU)

(73) Assignee: Thermo Fisher Scientific (Bremen) GmbH, Bremen (DE)

( * ) Notice: Subject to any disclaimer, the term of this patent is extended or adjusted under 35 U.S.C. 154(b) by 260 days.

(21) Appl. No.: 12/296,831

(22) PCT Filed: Apr. 13, 2007

(86) PCT No.: PCT/GB2007/001370

§ 371 (c)(1),
(2), (4) Date: Oct. 10, 2008

(87) PCT Pub. No.: WO2007/122383

PCT Pub. Date: Nov. 1, 2007

(65) Prior Publication Data

US 2009/0206248 A1 Aug. 20, 2009

(30) Foreign Application Priority Data

Apr. 13, 2006 (GB) ................................ 0607542.8

(51) Int. Cl.
*H01J 49/26* (2006.01)
*H01J 27/02* (2006.01)
*B01D 59/44* (2006.01)

(52) U.S. Cl. ....................... 250/282; 250/281; 250/283; 250/290; 250/396 R; 250/423 R; 250/424

(58) Field of Classification Search ................. 250/282, 250/281, 283, 290, 396 R, 423 R, 424
See application file for complete search history.

(56) References Cited

U.S. PATENT DOCUMENTS 3,174,034 A 3/1965 Behrisch et al.

(Continued)

FOREIGN PATENT DOCUMENTS

DE 44 08 489 A1 9/1995

(Continued)

OTHER PUBLICATIONS

V. Frankevich et al., "Deceleration of High-Energy Matrix-Assisted Laser Desorption/Ionization Ions in an Open Cell for Fourier Transform Ion Cyclotron Resonance Mass Spectrometry," Rapid Communications in Mass Spectrometry, Heyden (London), vol. 15, (2001), pp. 2035-2040.

*Primary Examiner*—Nikita Wells
(74) *Attorney, Agent, or Firm*—Charles B. Katz

(57) ABSTRACT

A method for reducing the energy spread of ions over a specific and limited mass to charge ratio range is disclosed, along with an ion deceleration arrangement for implementing such a method. An electric field, having an electric field strength E is generated by a deceleration electrode arrangement (250). Ions of a specific and limited mass to charge ratio range, but having a spread of energies, are directed into the decelerating electric field generated by the deceleration electrode arrangement (250). The decelerating electric field is then removed, once substantially all of the ions of the specific mass to charge ratio range have entered the decelerating electric field. By matching the electric field strength E to the energy spread of the ions upon entry into the electric field, the energy spread of the said ions is reduced. Preferred embodiments of the invention employ energy dispersion upstream of the ion deceleration arrangement. For example, an ion mirror arrangement (200) may be used, the ions reflecting off an ion mirror (220) within that ion mirror arrangement (200) to promote energy defocusing.

22 Claims, 11 Drawing Sheets

U.S. PATENT DOCUMENTS

| | | | | |
|---|---|---|---|---|
| 3,226,543 | A | 12/1965 | Melzner | |
| 5,880,466 | A | 3/1999 | Benner | |
| 6,013,913 | A | 1/2000 | Hanson | |
| 6,107,625 | A | 8/2000 | Park | |
| 6,300,625 | B1 | 10/2001 | Ishihara | |
| 6,483,109 | B1 | 11/2002 | Reinhold et al. | |
| 6,504,148 | B1 | 1/2003 | Hager | |
| 6,541,765 | B1 | 4/2003 | Vestal | |
| 6,586,727 | B2 | 7/2003 | Bateman et al. | |
| 6,670,606 | B2 | 12/2003 | Verentchikov et al. | |
| 6,717,130 | B2 | 4/2004 | Bateman et al. | |
| 6,720,554 | B2 | 4/2004 | Hager | |
| 6,794,642 | B2 | 9/2004 | Bateman et al. | |
| 6,872,938 | B2 | 3/2005 | Makarov et al. | |
| 6,875,980 | B2 | 4/2005 | Bateman et al. | |
| 6,888,130 | B1 | 5/2005 | Gonin | |
| 6,906,319 | B2 | 6/2005 | Hoyes | |
| 7,435,976 | B2 * | 10/2008 | Naito et al. | 250/492.21 |
| 2003/0066958 | A1 | 4/2003 | Okumura et al. | |
| 2003/0213900 | A1 | 11/2003 | Hoyes | |
| 2004/0217272 | A1 | 11/2004 | Horning et al. | |
| 2004/0222370 | A1 | 11/2004 | Bateman et al. | |
| 2005/0017169 | A1 | 1/2005 | Yamaguchi | |
| 2005/0045817 | A1 | 3/2005 | Yamaguchi et al. | |
| 2005/0077461 | A1 | 4/2005 | Yamaguchi et al. | |
| 2005/0077462 | A1 | 4/2005 | Yamaguchi et al. | |
| 2005/0087684 | A1 | 4/2005 | Farnsworth | |
| 2005/0092913 | A1 | 5/2005 | Ishihara | |
| 2005/0098719 | A1 | 5/2005 | Thomson | |
| 2005/0103992 | A1 | 5/2005 | Yamaguchi et al. | |
| 2005/0151076 | A1 | 7/2005 | Yamaguchi et al. | |
| 2009/0166527 | A1 * | 7/2009 | Makarov | 250/282 |
| 2009/0166528 | A1 * | 7/2009 | Makarov | 250/282 |

FOREIGN PATENT DOCUMENTS

| | | | |
|---|---|---|---|
| GB | 2 080 021 | A | 1/1982 |
| JP | 2001-143654 | A | 5/2001 |
| JP | 2004-158360 | A | 6/2004 |
| SU | 1725289 | A1 | 7/1992 |
| WO | WO 02/103747 | A1 | 12/2002 |
| WO | WO 2005/001878 | A2 | 1/2005 |
| WO | WO 2006/009882 | A2 | 1/2006 |
| WO | WO 2006/103445 | A2 | 10/2006 |
| WO | WO 2007/122378 | A2 | 11/2007 |
| WO | WO 2007/122379 | A2 | 11/2007 |
| WO | WO 2007/122381 | A2 | 11/2007 |
| WO | WO 2007/122383 | A2 | 11/2007 |

* cited by examiner

ION ENERGY SPREAD REDUCTION FOR MASS SPECTROMETER

CROSS-REFERENCE TO RELATED APPLICATIONS

This application is a National Stage application under 35 U.S.C. §371 of PCT Application No. PCT/GB2007/001370, filed Apr. 13, 2007, entitled "Ion Energy Spread Reduction For Mass Spectrometer", which claims the priority benefit of GB Application No. 0607542.8, filed Apr. 13, 2006, entitled "Mass Spectrometer with Ion Storage Device", which applications are incorporated herein by reference in their entireties.

FIELD OF THE INVENTION

The present invention relates to a method and an apparatus for reducing ion energy spread in a mass spectrometer or a component thereof. The invention is particularly though not exclusively applicable to the reduction of ion energy spread for ions injected into a fragmentation or collision cell.

BACKGROUND TO THE INVENTION

Many ion optical devices can only function well with ions having energies within a limited energy range. Examples include electrostatic lenses, in which chromatic aberrations cause defocusing, RF multipoles or quadrupole mass filters in which the number of RF cycles experienced by the ions as they travel the finite length of the device is a function of the ion energy, and magnetic optics which disperse in both mass and energy. Reflectors are typically designed to provide energy focusing so as to compensate for a range of ion beam energies, but higher order energy aberrations usually exist.

Tandem mass spectrometry is a well known technique by which trace analysis and structural elucidation of samples may be carried out. In a first step, parent ions are mass analysed/filtered to select ions of a mass to change ratio of interest, and in a second step these ions are fragmented by, for example, collision with a gas such as argon. The resultant fragment ions are then mass analysed usually by producing a mass spectrum.

Successful operation of the fragmentation device that carries out fragmentation of parent ions is likewise limited by the degree of energy spread of ions that enter it. For example, an energy spread in excess of about 10-20 eV affects fragmentation: higher energies result in only low-mass fragments, while lower energies result in little fragmentation.

SUMMARY OF THE INVENTION

Against this background and in accordance with the present invention there is provided a method of reducing the energy spread of ions over a specific and limited mass to charge ratio range, the method comprising the steps of (a) generating an electric field having an electric field strength E using a deceleration electrode arrangement; (b) directing ions of the mass to charge ratio range, having a spread of energies, into the decelerating electric field generated by the deceleration electrode arrangement; and (c) removing the decelerating electric field at a time t, once substantially all of the ions of the specific mass to charge ratio range have entered the decelerating electric field; wherein the electric field strength E is matched to the energy spread of the ions upon entry into the electric field so as to reduce the energy spread of the said ions.

Such a technique may result in a significant reduction in the amount of energy spread of ions of a particular mass to charge ratio range of interest.

Optionally a further step of energy dispersion is carried out prior to this, for example using an ion mirror. Alternatively an electrostatic trap (EST) may be employed with electrostatic mirrors that reflect the ions back and forth over multiple reflections; in that case, by briefly switching the voltage to one of these mirrors when the ions of the mass to charge ratio range of interest are in the vicinity of it, ion energy defocusing can be achieved.

The ion deceleration arrangement may be differentially pumped. This is particularly useful if seeking to interface an EST or other device able to eject ions of a single mass to charge ratio (eg a 3D ion trap, an Orbitrap operated in resonant ejection mode, etc), which typically operates at a relatively low pressure, to a fragmentation or collision cell that operates at a relatively higher pressure.

According to a further aspect of the present invention there is provided an ion deceleration arrangement for reducing the energy spread of ions over a specific but limited mass to charge ratio range, comprising a deceleration electrode arrangement for generating an electric field having an electric field strength E, the deceleration electrode arrangement including one or more deceleration electrodes; a voltage supply for supplying a voltage to the said one or more deceleration electrodes; and a voltage controller configured to switch the voltage supply so as to remove the decelerating electric field at a time t after the introduction of ions of the mass to charge ratio range, having a spread of energies, into the decelerating electric field generated by the deceleration electrode arrangement and once substantially all of the ions of the specific mass to charge ratio range have entered the decelerating electric field; wherein the controller and/or the voltage supply are configured to produce an electric field strength E which is matched to the energy spread of the ions upon entry into the electric field so as to reduce the energy spread of the said ions.

Preferably the arrangement also includes an ion energy dispersion device located upstream of the ion deceleration arrangement.

The ion energy dispersion device may comprise an ion mirror assembly, having an ion mirror for reflecting ions received into the ion mirror assembly back out of it. The deceleration electrode arrangement is located within a differentially pumped housing. In that case, the arrangement may further comprise a multipolar RF device, such as an octapole RF only device, downstream of the deceleration electrode arrangement.

The invention may also extend to the arrangement when in combination with an ion selection device such as an EST upstream thereof, and/or in combination with a fragmentation or collision cell downstream thereof.

Further aspects of the present invention provide for a method of mass spectrometry comprising the steps of, in a first cycle, storing sample ions in a first ion storage device, the first ion storage device having an exit aperture and a spatially separate ion transport aperture; ejecting the stored ions out of the exit aperture into a separate ion selection device; receiving at least some of the ions ejected from the first ion storage device, or their derivatives, back through the ion transport aperture of the first ion storage device; and storing the received ions in the first ion storage device.

This cycle may be repeated, optionally, multiple times, so as to allow $MS^n$.

This aspect of the present invention thus employs a cyclical arrangement in which ions are trapped, optionally cooled, and ejected from an exit aperture. These ions (or a subset thereof, following external processing such as fragmentation, ion selection, and so forth) is returned to the ion storage device, where they re-enter this ion storage device via a second, spatially separate ion transport aperture (acting in this case as an inlet aperture). This cyclical arrangement provides a number of advantages over the art identified in the introduction above, which instead employs a "back and forth" procedure via the same aperture in the ion trap. Firstly, the number of devices required to store and inject ions into the ion selector is minimised (and in the preferred embodiment is just one). Modern storage and injection devices that permit very high mass resolution and dynamic range are expensive to produce and demanding to control so that the arrangement of the present invention represents a significant cost and control saving over the art. Secondly, by using the same (first) ion storage device to inject into, and receive ions back from, an external ion selection device, the number of MS stages is reduced. This in turn improves ion transport efficiency which depends upon the number of MS stages. Typically, ions ejected from an external ion selector will have very different characteristics to those of the ions ejected from the ion storage device. By loading ions into the ion storage device through a dedicated ion inlet port (the first ion transport aperture), particularly when arriving back at the ion storage device from an external fragmentation device, this process can be carried out in a well controlled manner. This minimises ion losses which in turn improves the ion transport efficiency of the apparatus.

In a preferred embodiment of the invention, a fragmentation device is located externally of the ion storage device. An external ion selection device may additionally or alternatively be provided. In certain preferred embodiments, the fragmentation device is located between such an ion selection device (but externally thereof) and the ion storage device.

An ion source may be provided to supply a continuous or pulsed stream of sample ions to the ion storage device. In one preferred arrangement, the optional fragmentation device may be located between such an ion source and the ion storage device instead. In either case, complicated $MS^n$ experiments may be carried out in parallel by allowing division of (and, optionally, separate analysis of) sub populations of ions, either directly from the ion source or deriving from previous cycles of MS. This in turn results in an increase in the duty cycle of the instrument and can likewise improve the detection limits of it as well.

Although preferred embodiments of the invention may employ any ion selection device, it is particularly suited to and beneficial in combination with an electrostatic trap (EST). In recent years, mass spectrometers including electrostatic traps (ESTs) have started to become commercially available. Relative to quadrupole mass analysers/filters, ESTs have a much higher mass accuracy (parts per million, potentially), and relative to quadrupole-orthogonal acceleration TOF instruments, they have a much superior duty cycle and dynamic range. Within the framework of this application, an EST is considered as a general class of ion optical devices wherein moving ions change their direction of movement at least along one direction multiple times in substantially electrostatic fields. If these multiple reflections are confined within a limited volume so that ion trajectories are winding over themselves, then the resultant EST is known as a "closed" type. Examples of this "closed" type of mass spectrometer may be found in U.S. Pat. No. 3,226,543, DE-A-04408489, and U.S. Pat. No. 5,886,346. Alternatively, ions could combine multiple changes in one direction with a shift along another direction so that the ion trajectories do not wind on themselves. Such ESTs are typically referred to as of the "open" type and examples may be found in GB-A-2,080,021, SU-A-1,716,922, SU-A-1,725,289, WO-A-2005/001878, and US-A-20050103992 FIG. 2.

Of the electrostatic traps, some, such as those described in U.S. Pat. No. 6,300,625, US-A-2005/0,103,992 and WO-A-2005/001878 are filled from an external ion source and eject ions to an external detector downstream of the EST. Others, such as the Orbitrap as described in U.S. Pat. No. 5,886,346, employ techniques such as image current detection to detect ions within the trap without ejection.

Electrostatic traps may be used for precise mass selection of externally injected ions (as described, for example, in U.S. Pat. No. 6,872,938 and U.S. Pat. No. 6,013,913). Here, precursor ions are selected by applying AC voltages in resonance with ion oscillations in the EST. Moreover, fragmentation within the EST is achieved through the introduction of a collision gas, laser pulses or otherwise, and subsequent excitation steps are necessary to achieve detection of the resultant fragments (in the case of the arrangements of U.S. Pat. No. 6,872,938 and U.S. Pat. No. 6,013,913, this is done through image current detection).

Electrostatic traps are not, however, without difficulties. For example, ESTs typically have demanding ion injection requirements. For example, our earlier patent applications number WO-A-02/078046 and WO05124821A2 describe the use of a linear trap (LT) to achieve the combination of criteria required to ensure that highly coherent packets are injected into an EST device. The need to produce very short time duration ion packets (each of which contains large numbers of ions) for such high performance, high mass resolution devices means that the direction of optimum ion extraction in such ion injection devices is typically different from the direction of efficient ion capture.

Secondly, advanced ESTs tend to have stringent vacuum requirements to avoid ion losses, whereas the ion traps and fragmentors to which they may interface are typically gas filled so that there is typically at least 5 orders of magnitude pressure differential between such devices and the EST. To avoid fragmentation during ion extraction, it is necessary to minimise the product of pressure by gas thickness (typically, to keep it below $10^{-3} \ldots 10^{-2}$ mm*torr), while for efficient ion trapping this product needs to be maximised (typically, to exceed 0.2 . . . 0.5 mm*torr)

Where the ion selection device is an EST, therefore, in a preferred embodiment of the present invention, the use of an ion storage device with different ion inlet and exit ports permits the same ion storage device to provide ions in an appropriate manner for injection into the EST, but nevertheless to allow the stream or long pulses of ions coming back from the EST via the fragmentation device to be loaded back into that first ion storage device in a well controlled manner, through the second or in certain embodiments, the third ion transport aperture.

Any form of electrostatic trap may be used, if this is what constitutes the ion selection device. A particularly preferred arrangement involves an EST in which the ion beam cross-section remains limited due to the focusing effect of the electrodes of the EST, as this improves efficiency of the subsequent ion ejection from the EST. Either an open or a closed type EST could be used. Multiple reflections allow for increasing separation between ions of different mass-to-charge ratios, so that a specific mass-to-charge ratio of interest may, optionally, be selected, or simply a narrower range of mass-to-charge ratios than was injected into the ion selection device. Selection could be done by deflecting unwanted ions using electric pulses applied to dedicated electrodes, preferably located in the plane of time-of-flight focus of ion mirrors.

In the case of closed EST, a multitude of deflection pulses might be required to provide progressively narrowing m/z ranges of selection.

It is possible to use the fragmentation device in two modes: in a first mode, precursor ions can be fragmented in the fragmentation device in the usual manner, and in a second mode, by controlling the ion energy, precursor ions can pass through the fragmentation device without fragmentation. This allows both $MS^n$ and ion abundance improvement, together or separately: once ions have been injected from the first ion storage device into the ion selection device, specific low abundance precursor ions can be ejected controllably from the ion selection device and be stored back in the first ion storage device, without having been fragmented in the fragmentation device. This may be achieved by passing these low abundance precursor ions through the fragmentation device at energies insufficient to cause fragmentation. Energy spread could be reduced for a given m/z by employing pulsed deceleration fields (e.g. formed in a gap between two flat electrodes with apertures). When ions enter a decelerating electric field on the way back from the mass selector to the first ion storage device, higher energy ions overtake lower energy ions and thus move to a greater depth in the deceleration field. After all the ions of this particular m/z enter the deceleration field, the field is switched off. Therefore ions with initially higher energy experience a higher drop in potential relatively to ground potential than the lower energy ions, thus making their energies equal. By matching the potential drop to the energy spread upon exit from the mass selector, a significant reduction of the energy spread may be achieved. Fragmentation of ions may thereby be avoided, or, alternatively, control over the fragmentation may be improved.

In accordance with a second aspect of the present invention, there is provided an ion storage device for a mass spectrometer, comprising an ion exit aperture and a spatially separate ion transport aperture, the ion storage device being configured, in a first cycle, to eject stored ions out of the ion exit aperture, to receive ions back in through the separate ion transport aperture thereof, and to store the received ions therein. The invention in this aspect also extends to a mass spectrometer including such an ion storage device together with an ion selection device and/or an ion fragmentation device.

In accordance with a further aspect of the present invention, there is provided a method of mass spectrometry comprising storing ions in a first ion storage device; ejecting ions from the first ion storage device to an ion selection device; selecting a subset of ions within the ion selection device; ejecting the ions from the ion selection device; capturing at least some of the selected ions in one of a fragmentation device or second ion storage device; and returning at least some of the ions captured in the said one of the fragmentation device or second ion storage device respectively, or their products, to the first ion storage device along a return ion path that bypasses the ion selection device.

In still a further aspect of the present invention there is provided a method of improving the detection limits of a mass spectrometer comprising generating sample ions from an ion source; storing the sample ions in a first ion storage device; ejecting the stored ions into an ion selection device; selecting and ejecting ions of a chosen mass to charge ratio out of the ion selection device; storing the ions ejected from the ion selection device in a second ion storage device without passing them back through the ion selection device; repeating the preceding steps to so as to augment the ions of the said chosen mass to charge ratio stored in the second ion storage device; and transferring the augmented ions of the said chosen mass to charge ratio back to the first ion storage device for subsequent analysis.

This technique allows the detection limit of the instrument to be improved, where the ions of the chosen mass to charge ratio are of low abundance in the sample. Once a sufficient quantity of these low abundance precursor ions have been built up in the second ion storage device, they can be injected back to the first ion storage device for capture there (again, bypassing the ion selection device) and subsequent $MS^n$ analysis, for example. Although preferably the ions leave the first ion storage device through a first ion transport aperture and are received back into it via a second separate ion transport aperture, this is not essential in this aspect of the invention and ejection and capture through the same aperture are feasible.

Optionally, at the same time as the low abundance precursor ions are being moved to the second ion storage device to improve total population of these particular precursor ions, the ion selection device may continue to retain and further refine the selection of other desired precursor ions. When sufficiently narrowly selected, these precursor ions can be ejected from the ion selection device and fragmented in a fragmentation device to produce fragment ions. These fragment ions may then be transferred to the first ion storage device, and $MS^n$ of these fragment ions may then be carried out or they may likewise be stored in the second ion storage device so that subsequent cycles may further enrich the number of ions stored in this way to again increase the detection limit of the instrument for that particular fragment ion.

Thus in accordance with a further aspect of the present invention there is provided a method of improving the detection limits of a mass spectrometer comprising (a) generating sample ions from an ion source; (b) storing the sample ions in a first ion storage device; (c) ejecting the stored ions into an ion selection device; (d) selecting and ejecting ions of analytical interest out of the ion selection device; (e) fragmenting the ions ejected from the ion selection device in a fragmentation device; (f) storing fragment ions of a chosen mass to charge ratio in a second ion storage device without passing them back through the ion selection device; (g) repeating the preceding steps (a) to (f) so as to augment the fragment ions of the said chosen mass to charge ratio stored in the second ion storage device, and (g) transferring the augmented fragment ions of the said chosen mass to charge ratio back to the first ion storage device for subsequent analysis.

As above, ion ejection from the first ion storage device and ion capture back there may be through separate ion transport apertures or through the same one.

Ions in the first ion storage device may be mass-analysed either in a separate mass analyser, such as an Orbitrap as described in the above-referenced U.S. Pat. No. 5,886,346, or may instead be injected back into the ion selection device for mass analysis there.

In accordance with still another aspect of the present invention there is provided a method of mass spectrometry comprising accumulating ions in an ion trap, injecting the accumulated ions into an ion selection device, selecting and ejecting a subset of the ions in the ion selection device, and storing the ejected subset of the ions directly back in the ion trap without intermediate ion storage.

Other preferred embodiments and advantages of the present invention will become apparent from the following description of a preferred embodiment.

BRIEF DESCRIPTION OF THE DRAWINGS

The present invention may be put into practice in a number of ways and one preferred embodiment will now be described by way of example only and with reference to the accompanying drawings in which.

DETAILED DESCRIPTION OF PREFERRED EMBODIMENTS

Figure 1:
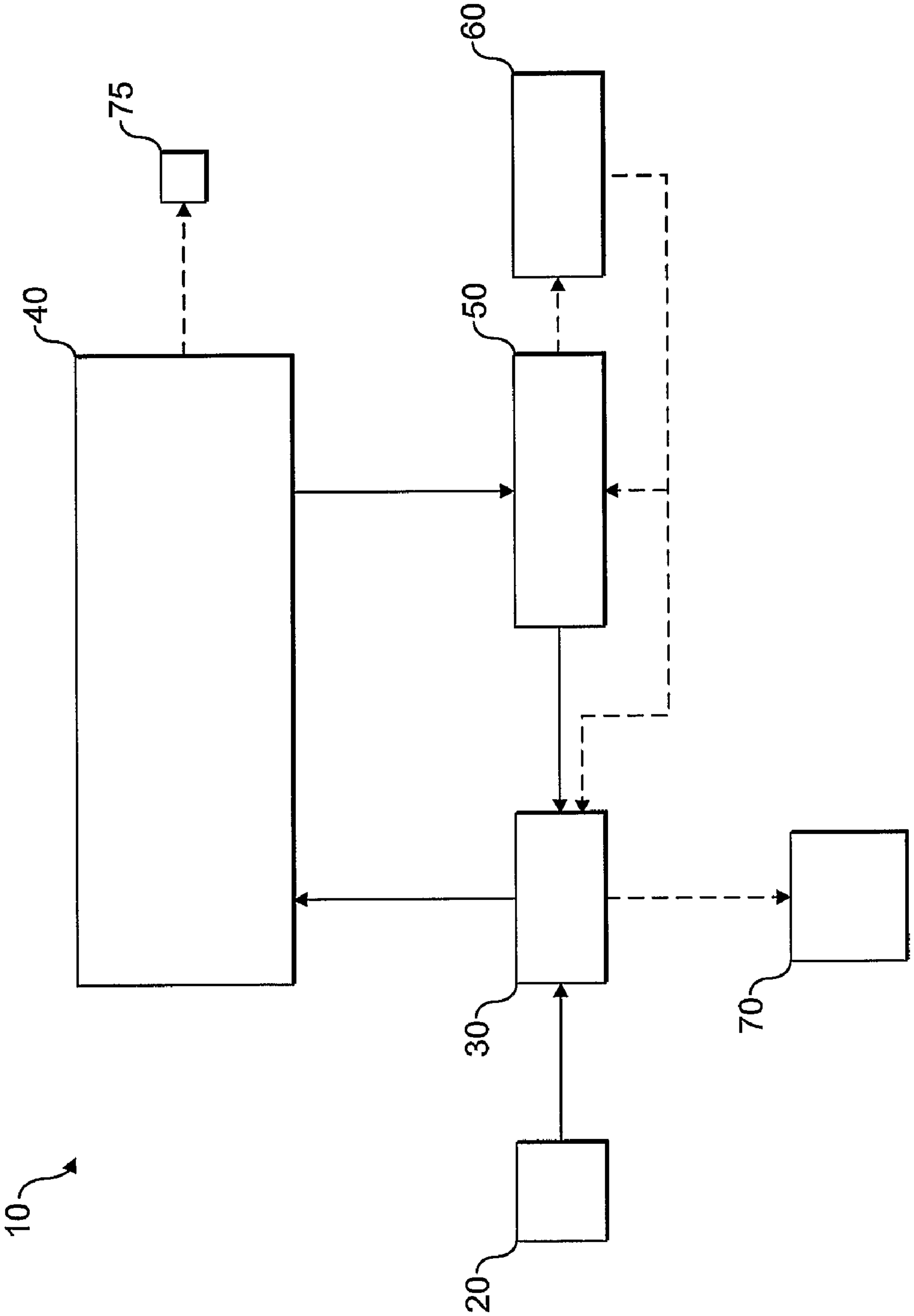
FIG. 1 shows, in block diagram form, an overview of a mass spectrometer embodying the present invention.

Referring first to FIG. 1, a mass spectrometer 10 is shown in block diagram format. The mass spectrometer 10 comprises an ion source 20 for generating ions to be mass analysed. The ions from the ion source 20 are admitted into an ion trap 30 which may, for example, be a gas-filled RF multipole or a curved quadrupole as is described, for example, in WO-A-05124821. The ions are stored in the ion trap 30, and collisional cooling of the ions may take place as is described for example in our co-pending application number GB0506287.2, the contents of which are incorporated herein by reference.

Ions stored in the ion trap 30 may then be pulse-ejected towards an ion selection device which is preferably an electrostatic trap 40. Pulsed ejection produces narrow ion packets. These are captured in the electrostatic trap 40 and experience multiple reflections therein in a manner to be described in connection particularly with FIG. 3 below. On each reflection, or after a certain number of reflections, unwanted ions are pulse-deflected out of the electrostatic trap 40, for example to a detector 75 or to a fragmentation cell 50. Preferably, the ion detector 75 is located close to the plane of time-of-flight focus of the ion mirrors, where the duration of the ion packets is at a minimum. Thus, only ions of analytical interest are left in the electrostatic trap 40. Further reflections will continue to increase the separation between adjacent masses, so that further narrowing of the selection window may be achieved. Ultimately, all ions having a mass-to-charge ratio adjacent to the mass-to-charge ratio m/z of interest are eliminated.

After the selection process is completed, ions are transferred out of the electrostatic trap 40 into the fragmentation cell 50 which is external to the electrostatic trap 40. Ions of analytical interest that remain in the electrostatic trap 40 at the end of the selection procedure are ejected with sufficient energy to allow them to fragment within the fragmentation cell 50.

Following fragmentation in the fragmentation cell, ion fragments are transferred back into the ion trap 30. Here they are stored, so that, in a further cycle, a next stage of MS may be carried out. In this manner, MS/MS or, indeed, $MS^n$ may be achieved.

An alternative or additional feature of the arrangement of FIG. 1 is that ions ejected from the electrostatic trap (because they are outside the selection window) may be passed through the fragmentation cell 50 without fragmentation. Typically, this could be achieved by decelerating such ions at relatively low energies so that they do not have sufficient energy to fragment in the fragmentation cell. These unfragmented ions which are outside of the selection window of immediate interest in a given cycle can be transferred onwards from the collision cell 50 to a auxiliary ion storage device 60. In subsequent cycles (for example, when further mass spectrometric analysis of the fragment ions as described above has been completed), the ions rejected from the electrostatic trap 40 in the first instance (because they are outside of the selection window of previous interest) can be transferred from the auxiliary ion storage device 60 to the ion trap 30 for separate analysis.

Moreover the auxiliary ion storage device 60 can be used to increase the number of ions of a particular mass to charge ratio, particularly when these ions have a relatively low abundance in the sample to be analysed. This is achieved by using the fragmentation device in non-fragmentation mode and setting the electrostatic trap to pass only ions of particular mass to charge ratio that is of interest but which is of limited abundance. These ions are stored in the auxiliary ion storage device 60 but are augmented by additional ions of that same chosen mass to charge ratio selected and ejected from the electrostatic trap 40 using similar criteria in subsequent cycles. Ions of multiple m/z ratios could be stored together as well, e.g. by using several ejections from the trap 40 with different m/z.

Of course, either the previously unwanted precursor ions, or the precursor ions that are of interest but which have a low abundance in the sample and thus first need to be increased in number, can be the subject of subsequent fragmentation for $MS^n$. In that case, the auxiliary ion storage device 60 could first eject its contents into the fragmentation cell 50, rather than transferring its contents directly back to the ion trap 30.

Mass analysis of ions can take place at various locations and in various ways. For example, ions stored in the ion trap may be mass-analysed in the electrostatic trap 40 (more details of which are set out below in connection with FIG. 2). Additionally or alternatively, a separate mass analyser 70 may be provided in communication with the ion trap 30.

Figure 2:
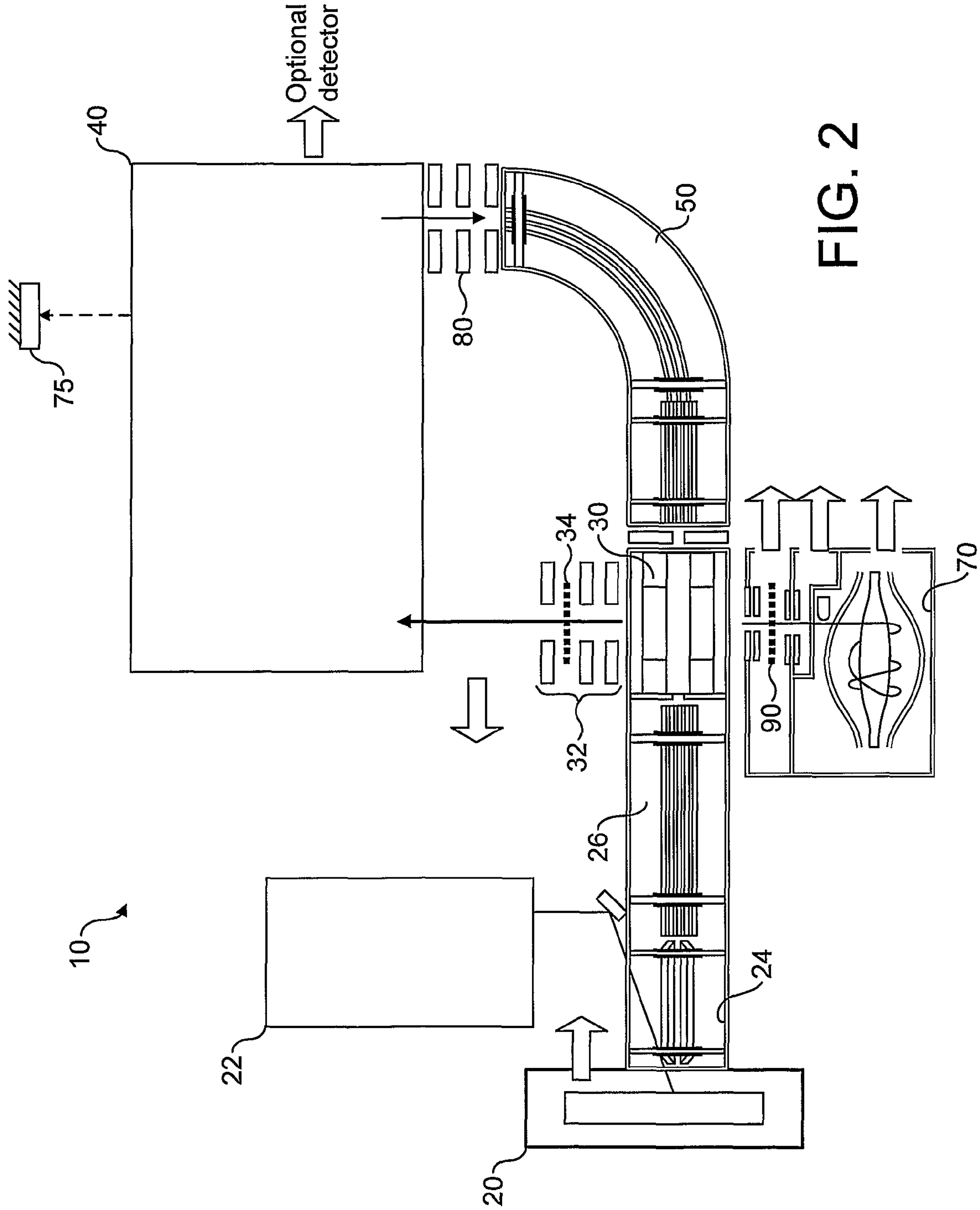
FIG. 2 shows a preferred implementation of the mass spectrometer of FIG. 1, including an electrostatic trap and a separate fragmentation cell.

Turning now to FIG. 2, a preferred embodiment of a mass spectrometer 10 is shown in more detail. The ion source 20 shown in FIG. 2 is a pulsed laser source (preferably a matrix-assisted laser desorption ionization (MALDI) source in which ions are generated through irradiation from a pulsed laser source 22). Nevertheless, a continuous ion source, such as an atmospheric pressure electrospray source, could equally be employed.

Between the ion trap 30 and the ion source 20 is a pre-trap 24 which may, for example, be a segmented RF-only gas-filled multipole. Once the pre-trap is filled, ions in it are transferred into the ion trap 30, which in the preferred embodiment is a gas-filled RF-only linear quadrupole, via a lens arrangement 26. The ions are stored in the ion trap 30 until the RF is switched off and a DC voltage is applied across the rods. This technique is set out in detail in our co-pending applications, published as GB-A-2,415,541 and WO-A-2005/124821, the details of which are incorporated herein in their entirety.

The applied voltage gradient accelerates ions through ion optics 32 which may, optionally, include a grid or electrode 34 arranged to sense charge. The charge-sensing grid 34 permits estimation of the number of ions. It is desirable to have an estimate of the number of ions since, if there are too many ions, the resulting mass shifts become difficult to compensate. Thus, if the ion number exceeds a predefined limit (as estimated using the grid 34), all ions may be discarded and an accumulation of ions in the pre-trap 24 may be repeated, with a proportionally lowered number of pulses from the pulsed laser 22, and/or a proportionally shorter duration of accumulation. Other techniques for controlling the number of trapped ions could be employed, such as are described in U.S. Pat. No. 5,572,022, for example.

Figure 3:
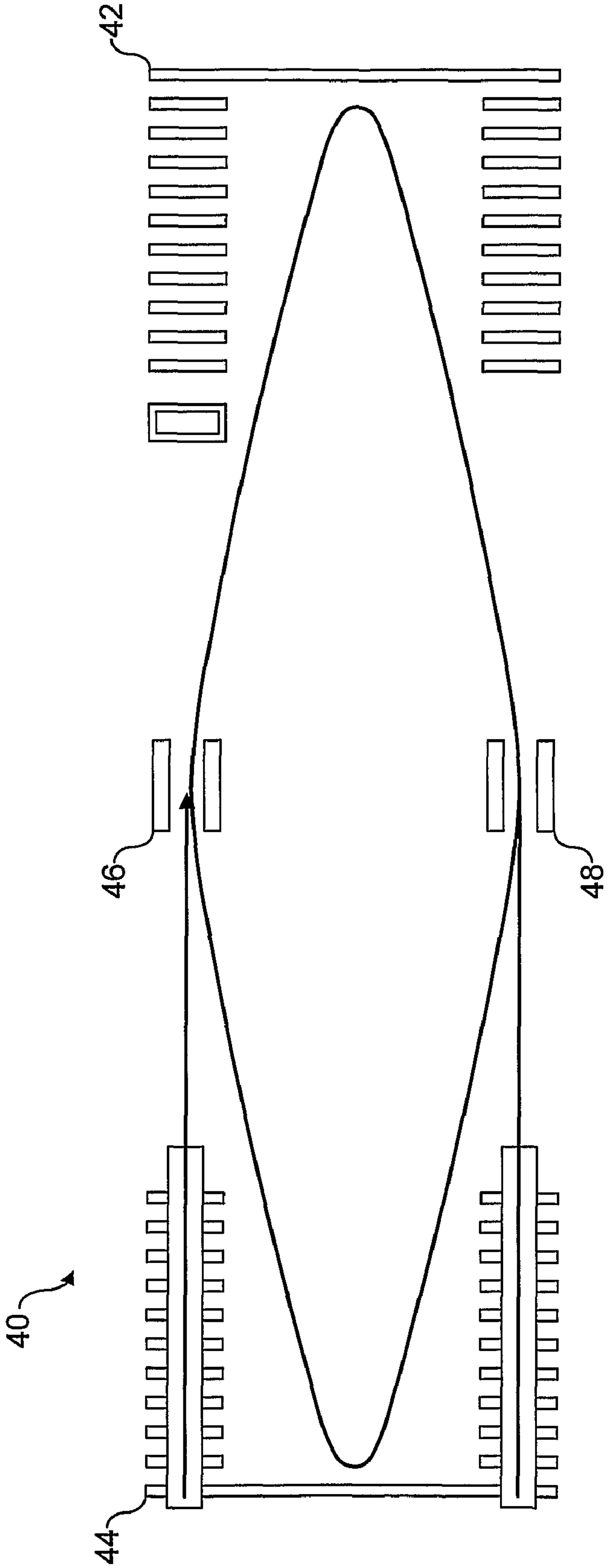
FIG. 3 shows a schematic representation of one particularly suitable arrangement of an electrostatic trap for use with the mass spectrometer of FIG. 2.

After acceleration through the ion optics 32 the ions are focused into short packets between 10 and 100 ns long for each m/z and enter the mass selector 40. Various forms of ion selection device may be employed, as will become apparent from the following. If the ion selection device is an electrostatic trap, for example, the specific details of that are not critical to the invention. For example, the electrostatic trap, if employed, may be open or closed, with two or more ion mirrors or electric sectors, and with or without orbiting. At present, a simple and preferred arrangement of an electrostatic trap embodying the ion selection device 40 is shown in FIG. 3. This simple arrangement comprises two electrostatic mirrors 42, 44 and two modulators 46, 48 that either keep ions on a recurring path or deflect them outside of this path. The mirrors may be formed of either a circular or a parallel plate. As the voltages on the mirrors are static, they may be sustained with very high accuracy, which is favourable for stability and mass accuracy within the electrostatic trap 40.

The modulators 46, 48 are typically a compact pair of openings with pulsed or static voltages applied across them, normally with guard plates on both sides to control fringing fields. Voltage pulses with rise and fall times of less than 10-100 ns (measured between 10% and 90% of peak) and amplitudes up to a few hundred volts are preferable for high-resolution selection of precursor ions. Preferably, both modulators 46 and 48 are located in the planes of time-of-flight focusing of the corresponding mirrors 42, 44 which, in turn, may preferably but do not necessarily coincide with the centre of the electrostatic trap 40. Typically, ions are detected through image current detection (which is in itself a well known technique and is not therefore described further).

Returning again to FIG. 2, after a sufficient number of reflections and voltage pulses within the electrostatic trap 40, only a narrow mass range of interest is left in the electrostatic trap 40, thus completing precursor ion selection. Selected ions in the EST 40 are then deflected on a path that is different from their input path and which leads to the fragmentation cell 50, or alternatively the ions may pass to detector 75. Preferably, this diversion to the fragmentation cell is performed through an ion deceleration arrangement 80 which is described in further detail in connection with FIGS. 9 to 13 below. The ultimate energy of the collisions within the fragmentation cell 50 may be adjusted by appropriate biasing of the DC offset on the fragmentation cell 50.

Preferably, the fragmentation cell 50 is a segmented RF-only multipole with axial DC field created along its segments. With appropriate gas density in the fragmentation cell (detailed below) and energy (which is typically between 30 and 50 V/kDa), ion fragments are transported through the cell towards the ion trap 30 again. Alternatively or concurrently, ions could be trapped within the fragmentation cell 50 and then be fragmented using other types of fragmentation such as electron transfer dissociation (ETD), electron capture dissociation (ECD), surface-induced dissociation (SID), photo-induced dissociation (PID), and so forth.

Once the ions have been stored in the ion trap 30 again, they are ready for onward transmission towards the electrostatic trap 40 for a further stage of $MS^n$, or towards the electrostatic trap 40 for mass analysis there, or alternatively towards the mass analyser 70 which may be a time-of-flight (TOF) mass spectrometer or an RF ion trap or FT ICR or, as shown in FIG. 2, an Orbitrap mass spectrometer. Preferably, the mass analyser 70 has its own automatic gain control (AGC) facilities, to limit or regulate space charge. In the embodiment of FIG. 2, this is carried out through an electrometer grid 90 on the entrance to the Orbitrap 70.

An optional detector 75 may be placed on one of the exit paths from the electrostatic trap 40. This may be used for a multitude of purposes. For example, the detector may be employed for accurate control of the number of ions during a pre-scan (that is, automatic gain control), with ions arriving directly from the ion trap 30. Additionally or alternatively, those ions outside of the mass window of interest (in other words, unwanted ions from the ion source, at least in that cycle of the mass analysis) may be detected using the detector. As a further alternative, the selected mass range in the electrostatic 40 may be detected with high resolution, following multiple reflections in the EST as described above. Still a further modification may involve the detection of heavy singly-charged molecules such as proteins, polymers and DNAs with appropriate post-acceleration stages. By way of example only, the detector may be an electron multiplier or a micro-channel/microsphere plate which has single ion sensitivity and can be used for detection of weak signals. Alternatively, the detector may be a collector and can thus measure very strong signals (potentially more than $10^4$ ions in a peak). More than one detector could be employed, with modulators directing ion packets towards one or another according to spectral information obtained, for example, from the previous acquisition cycle.

Figure 4:
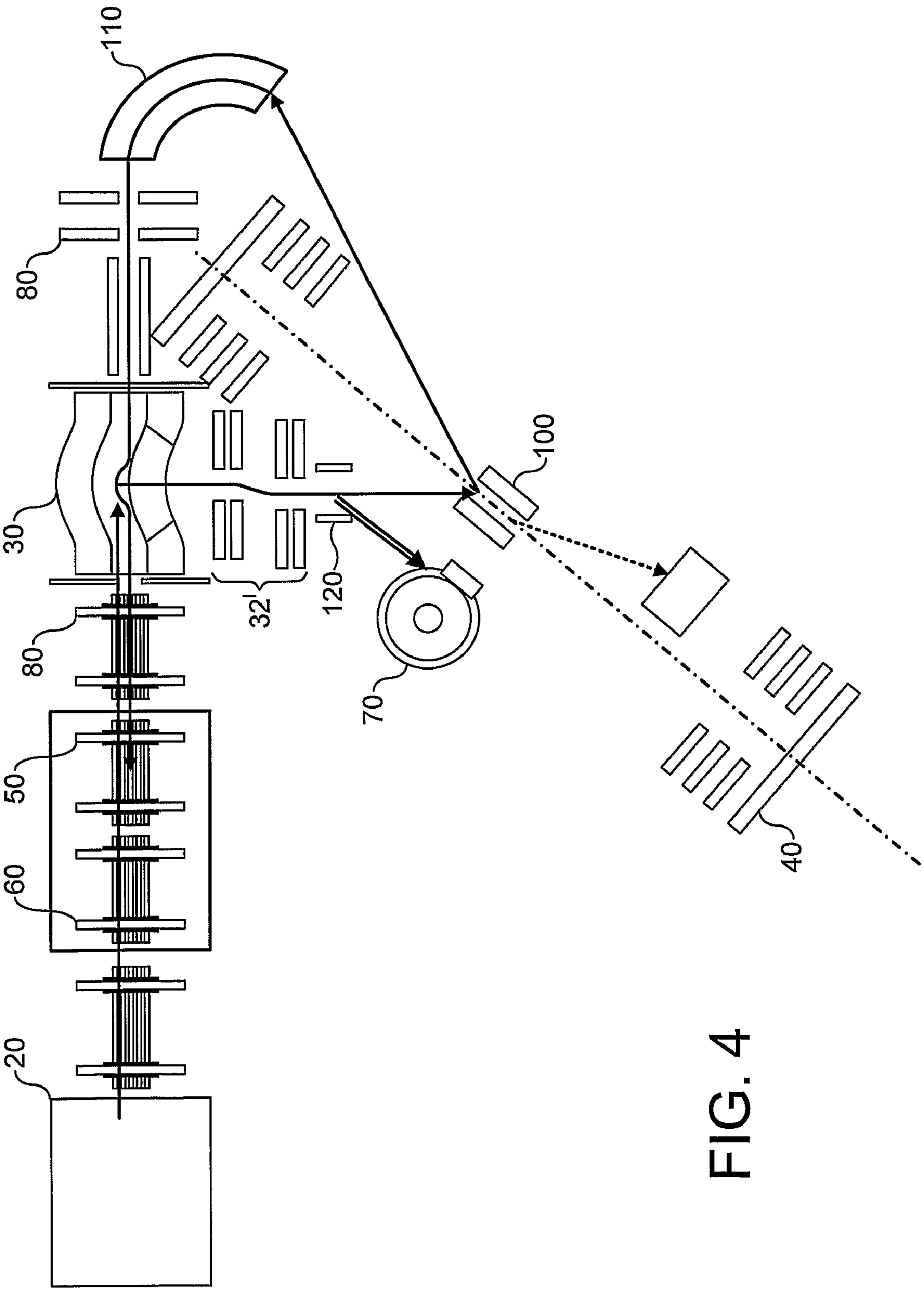
FIG. 4 shows a first alternative arrangement of a mass spectrometer embodying the present invention.

FIG. 4 illustrates an arrangement which is essentially similar to the arrangement of FIG. 2 though with some specific differences. As such, like reference numerals denote parts common to the arrangements of FIGS. 2 and 4.

The arrangement of FIG. 4 again comprises an ion source 20 which supplies ions to a pre-trap which in the embodiment of FIG. 4 is a auxiliary ion storage device 60. Downstream of that pre-trap/auxiliary ion storage device 60 is a ion trap 30 (which in the preferred embodiment is a curved trap) and a fragmentation cell 50. In contrast to the arrangement of FIG. 2, however, the arrangement of FIG. 4 locates the fragmentation cell between the ion trap 30 and the auxiliary ion storage device 60, that is, on the "source" side of the ion trap, rather than between the ion trap and the electrostatic trap as it is located in FIG. 2.

In use, ions are built up in the ion trap 30 and then orthogonally ejected from it through ion optics 32 to an electrostatic trap 40. A first modulator/deflector 100 downstream of the ion optics 32 directs the ions from the ion trap 30 into the EST 40. Ions are reflected along the axis of the EST 40 and, following ion selection there, they are ejected back to the ion trap 30. To assist with ion guiding in that process, an optional electric sector (such as a toroidal or cylindrical capacitor) 110 may be employed. A deceleration lens is located between the electric sector 110 and the return path into the ion trap 30. Deceleration may involve pulsed electric fields as described above.

Due to the low pressure in the ion trap 30, ions arriving back at that trap 30 fly through it and fragment in the fragmentation cell 50 which is located between that ion trap 30 and the auxiliary ion storage device 60 (i.e. on the ion source side of the ion trap 30). The fragments are then trapped in the ion trap 30.

As with FIG. 2, an Orbitrap mass analyser 70 is employed to allow accurate mass analysis of ions ejected from the ion trap 30 at any chosen stage of $MS^n$. The mass analyser 70 is located downstream of the ion trap (i.e. on the same side of the ion trap as the EST 40) and a second deflector 120 "gates" ions either to the EST 40 via the first deflector 100 or into the mass analyser 70.

Other components shown in FIG. 4 are RF only transport multipoles that act as interfaces between the various stages of the arrangement as will be well understood by those skilled in the art. Between the ion trap 30 and the fragmentation cell 50 may also be located an ion deceleration arrangement (see FIGS. 9-13 below).

Figure 5:
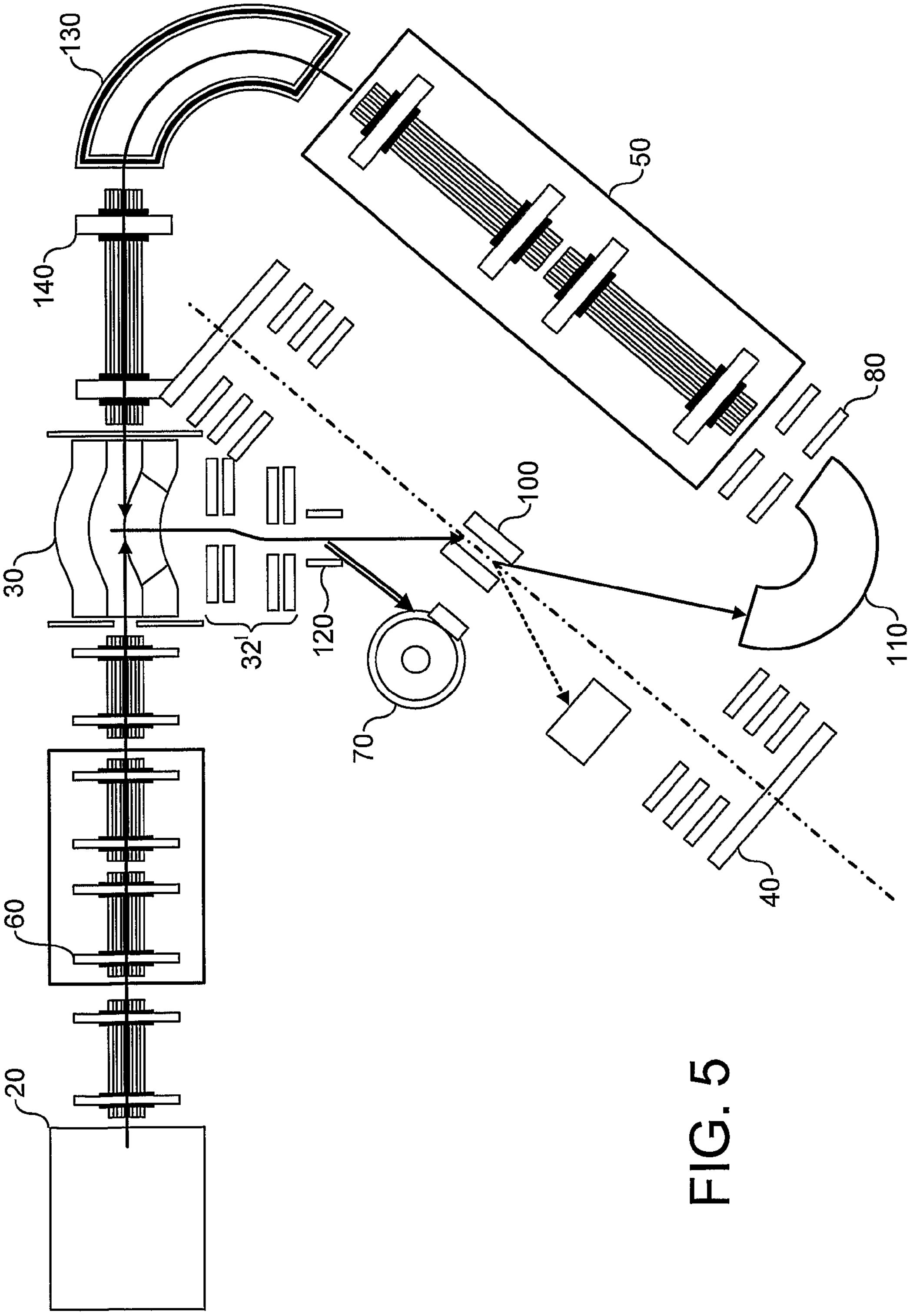
FIG. 5 shows a second alternative arrangement of a mass spectrometer embodying the present invention.

FIG. 5 shows a further alternative arrangement to that shown in FIG. 2 and FIG. 4 and like components are once again labelled with like reference numerals. The arrangement of FIG. 5 is similar to that of FIG. 2 in that ions are generated by an ion source 20 and then pass through (or bypass) a pre-trap and auxiliary ion storage device 60 before being stored in a ion trap 30. Ions are orthogonally ejected from the ion trap 30, through ion optics 32, and are deflected by a first modulator/deflector 100 onto the axis of an EST 40, as with FIG. 4.

In contrast to FIG. 4, however, as an alternative to ion selection in the EST 40, ions may instead be deflected by modulator/deflector 100 into an electric sector 110 and from there into a fragmentation cell 50 via an ion deceleration arrangement 80. Thus (in contrast to FIG. 4) the fragmentation cell 50 is not on the source side of the ion trap 30. Following ejection from the fragmentation cell 50, ions pass through a curved transport multipole 130 and then a linear RF only transport multipole 140 back into the ion trap 30. An Orbitrap or other mass analyser 70 is again provided to permit accurate mass analysis at any stage of $MS^n$.

Figure 6:
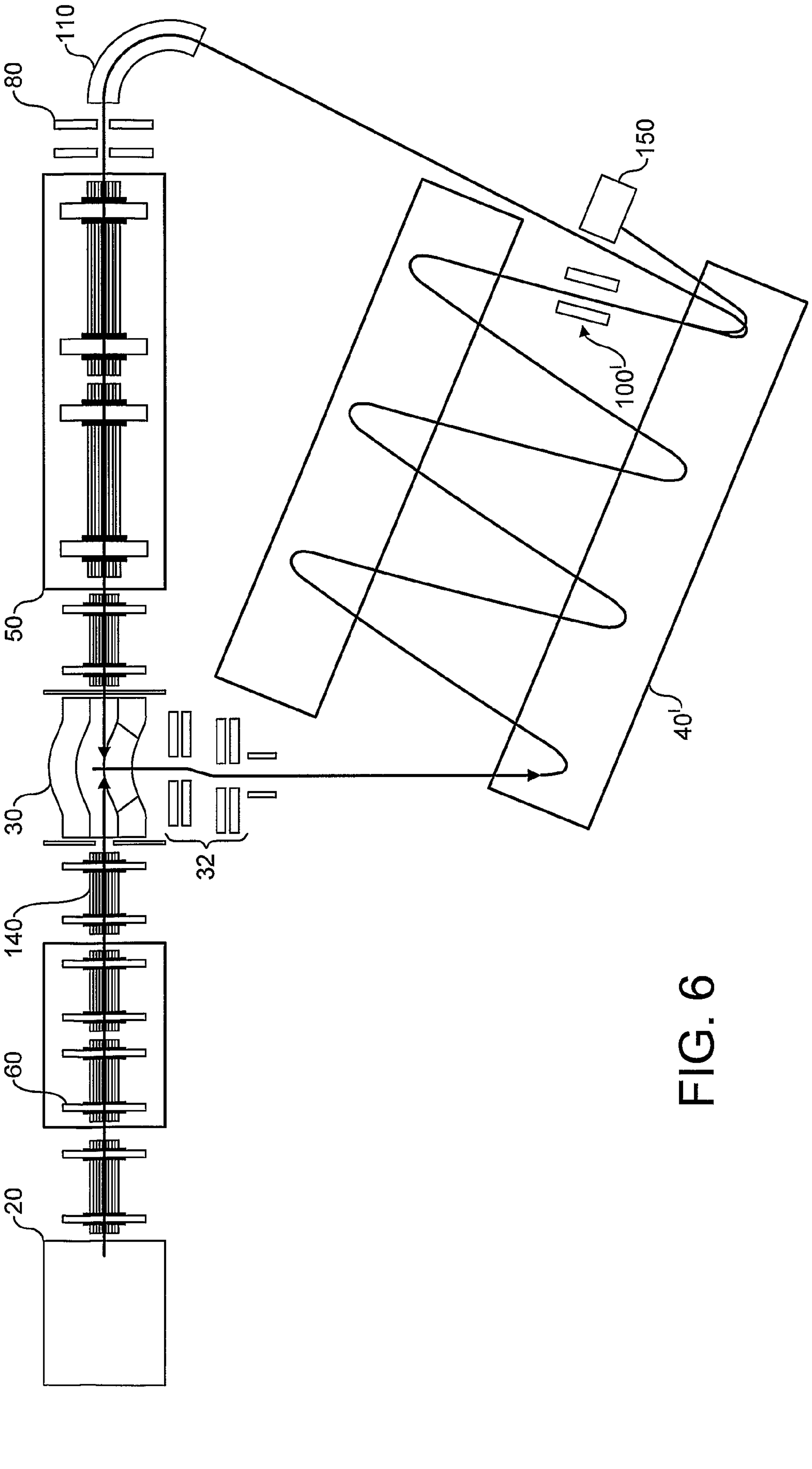
FIG. 6 shows a third alternative arrangement of a mass spectrometer embodying the present invention.

FIG. 6 shows still a further alternative arrangement which is essentially identical in concept to the arrangement of FIG. 2, except that the EST 40 is not of the "closed" type trap illustrated in FIG. 3, but is instead of the open type as is described in the documents set out in the introduction above.

More specifically, the mass spectrometer of FIG. 6 comprises an ion source 20 which provides a supply of ions to a pre-trap/auxiliary ion store 60 (further ion optics is also shown but is not labelled in FIG. 6). Downstream of the pre-trap/auxiliary ion storage device 60 is a further ion storage device which in the arrangement of FIG. 6 is once again a curved ion trap 30. Ions are ejected from the curved trap 30 in an orthogonal direction, through ion optics 32, towards an EST 40' where the ions undergo multiple reflections. A modulator/deflector 100' is located towards the "exit" of the EST 40' and this permits ions to be deflected either into a detector 150 or to a fragmentation cell 50 via an electric sector 110 and an ion decelerator arrangement 80. From here, ions may be injected back into the ion trap 30 once more, again through an entrance aperture which is distinct from the exit aperture through which ions pass on their way to the EST 40'. The arrangement of FIG. 6 also includes associated ion optics but this is not shown for the sake of clarity in that Figure.

In one alternative, the EST 40' of FIG. 6 may employ parallel mirrors (see, for example, WO-A-2005/001878) or elongate electric sectors (see, for example, US-A-2005/0103992). More complex shapes of trajectories or EST ion optics could be used.

Figure 7:
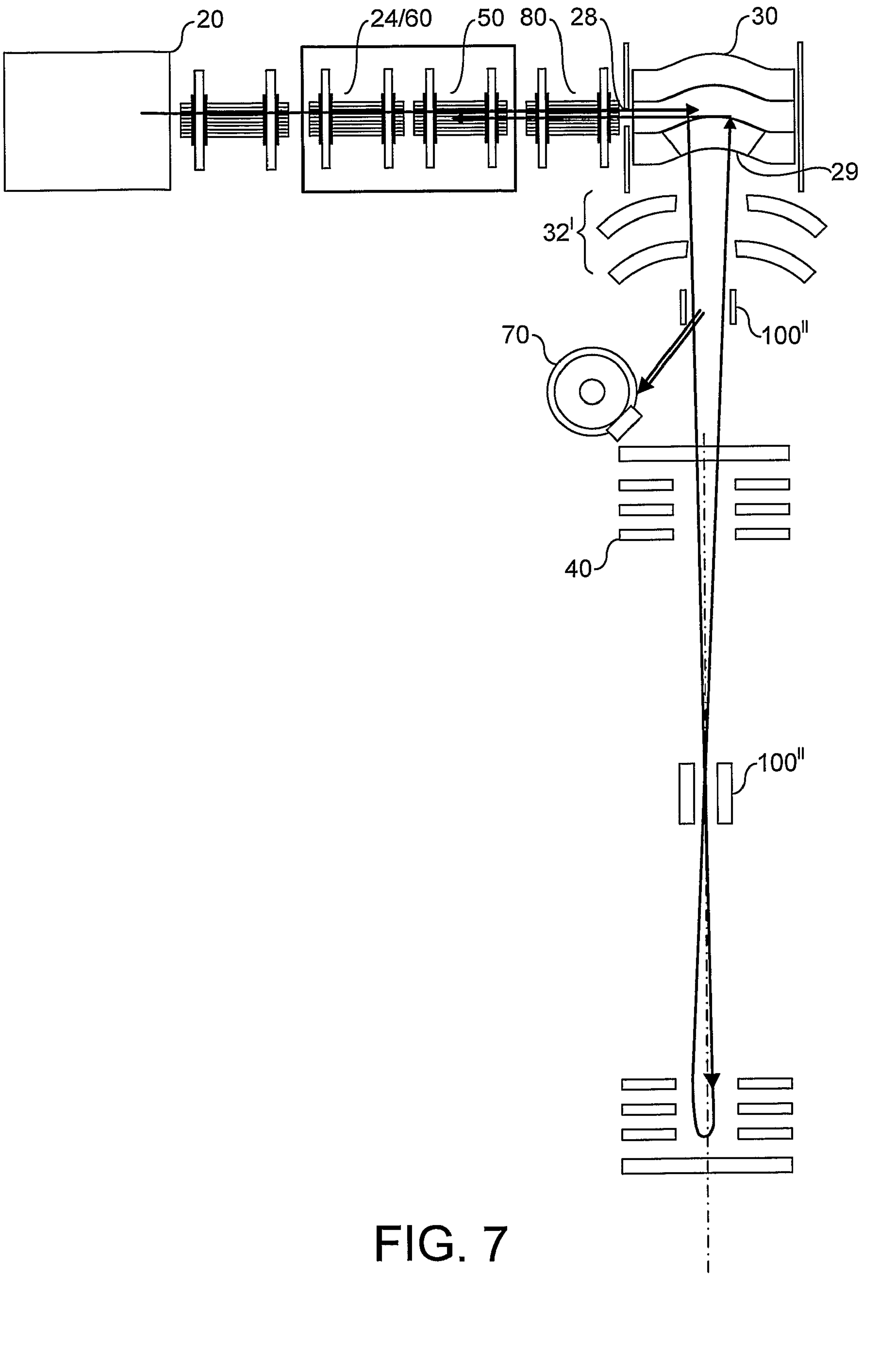
FIG. 7 shows a fourth alternative arrangement of a mass spectrometer embodying the present invention.

FIG. 7 shows still a further embodiment of a mass spectrometer in accordance with aspects of the present invention. As with FIG. 4, the spectrometer comprises an ion source 20 which supplies ions to a pre-trap which, as in the embodiment of FIG. 4, is a auxiliary ion storage device 60. Downstream of that pre-trap/auxiliary ion storage device 60 is a ion trap 30 (which in the preferred embodiment is a curved trap) and a fragmentation cell 50. The fragmentation cell 50 could be located on either side of the ion trap 30 though in the embodiment of FIG. 7 the fragmentation cell 50 is shown between the ion source 20 and the ion trap 30. As with the previous embodiments, an ion deceleration arrangement 80 is located in preference between the ion trap 30 and the fragmentation cell 50.

In use, ions enter the ion trap 30 via an ion entrance aperture 28 and are accumulated in the ion trap 30. They are then orthogonally ejected through an exit aperture 29 which is separate from the entrance aperture 28, to an electrostatic trap 40. In the arrangement shown in FIG. 7, the exit aperture is elongate in a direction generally perpendicular to the direction of ion ejection (i.e., the exit aperture 29 is slot-like). The ion position within the trap 30 is controlled so that the ions exit through one side (the left hand side as shown in FIG. 7) of the exit aperture 29. Control of the position of the ions within the ion trap may be achieved in a number of ways, such as by applying differing voltages to electrodes (not shown) on the ends of the ion trap 30. In one particular embodiment, ions may be ejected in a compact cylindrical distribution from the middle of the ion trap 30 whilst being recaptured as a much longer cylindrical distribution (as a result of divergence and aberrations within the system) of a much greater angular size.

Modified ion optics 32' are sited downstream of the exit from the ion trap 30, and, downstream of that, a first modulator/deflector 100" directs the ions into the EST 40. Ions are reflected along the axis of the EST 40. As an alternative to the directing of the ions from the ion trap 30 into the EST 40, the ions may instead be deflected by a deflector 100" downstream of the ion optics 32' into an Orbitrap mass analyser 70 or the like.

In the embodiment of FIG. 7, the ion trap 30 operates both as a decelerator and as an ion selector. The extraction (dc) potential across the ion trap 30 is switched off and the trapping (rf) potential is switched on at the exact point at which ions of interest come to rest in the ion trap 30 following their return from the EST 40. To inject into and eject from the EST 40, the voltages on the mirror within the EST 40 (FIG. 3) which is closest to the lenses is switched off in a pulsed manner. After ions of interest are captured in the ion trap 30, they are accelerated towards the fragmentation cell 50 on either side of the ion trap 30, where fragment ions are generated and then trapped. After that, the fragment ions can be transferred to the ion trap 30 once more.

By ejecting ions from a first side of an elongate slot and capturing them back at or towards a second side of such a slot, the path of ejection from the ion trap 30 is not parallel to the path of recapture into that trap 30. This in turn may allow injection of the ions into the EST 40 at an angle relative to the longitudinal axis of that EST 40, as is shown in the embodiments of FIGS. 4 and 5.

Of course, although a single slot-like exit aperture 29 is shown in FIG. 7, with ions exiting it towards a first side of that slot but being received back from the EST 40 via the other side of that slot, two (or more) separate but generally adjacent transport apertures (which may or may not then be elongate in the direction orthogonal to the direction of travel of ions through them) could instead be employed, with ions exiting via a first one of these transport apertures but returning into the ion trap 30 via an adjacent transport aperture.

Indeed, not only could the slot like exit aperture 29 of FIG. 7 be subdivided into separate transport apertures spaced in an generally orthogonal direction to the direction of travel of the ions during ejection and injection, but the curved ion trap 30 of FIG. 7 could itself be subdivided into separate segments. Such an arrangement is shown in FIG. 8.

Figure 8:
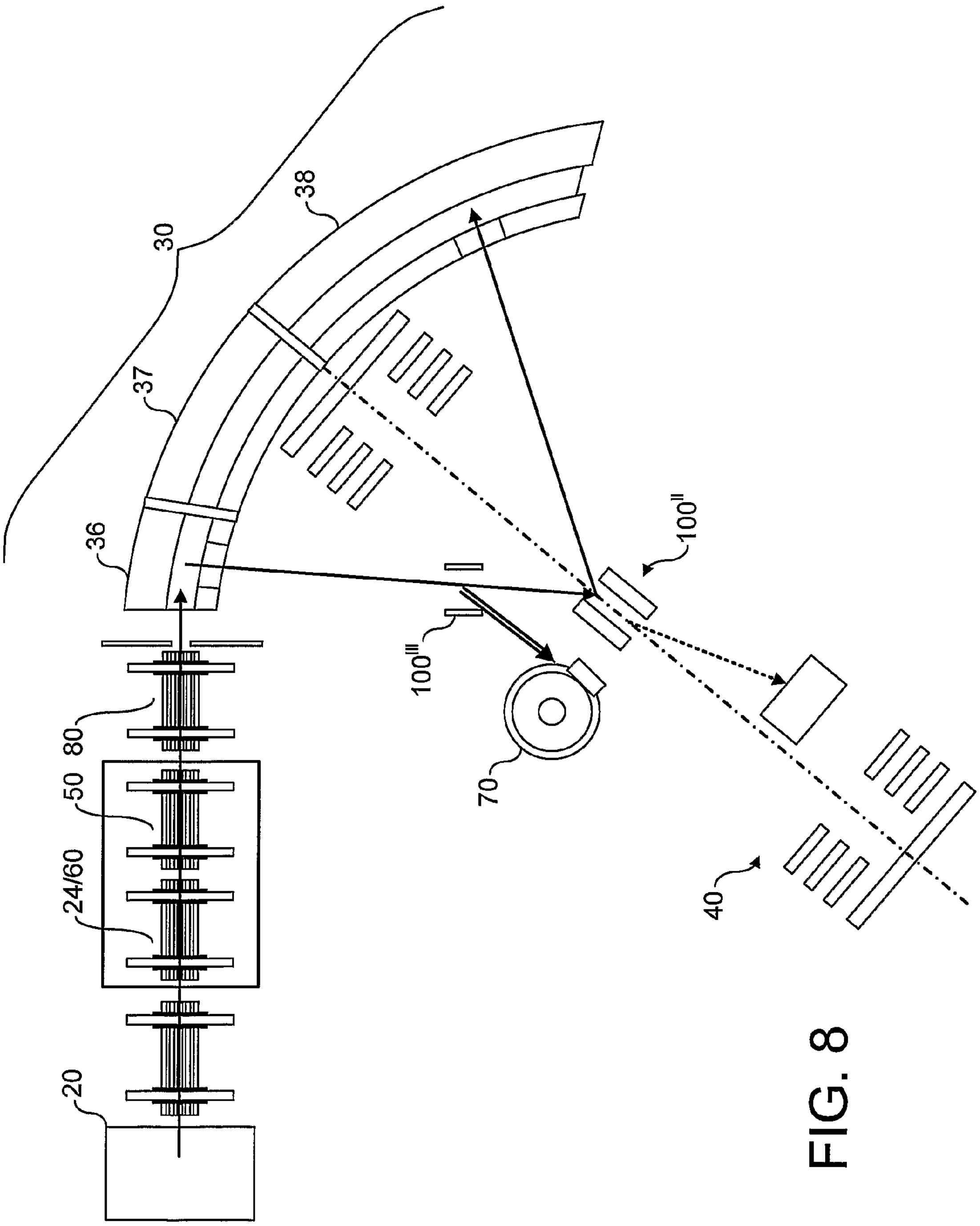
FIG. 8 shows a fifth alternative arrangement of a mass spectrometer embodying the present invention.

The arrangement of FIG. 8 is very similar to that of FIG. 7, in that the spectrometer comprises an ion source 20 which supplies ions to a pre-trap which is a auxiliary ion storage device 60. Downstream of that pre-trap/auxiliary ion storage device 60 is a ion trap 30' (to be described further below) and a fragmentation cell 50. As with the arrangement of FIG. 7, the fragmentation cell 50 in FIG. 8 could be located on either side of the ion trap 30' though in the embodiment of FIG. 8 the fragmentation cell 50 is shown between the ion source 20 and the ion trap 30', the ion trap 30' and the fragmentation cell 50 being separated by an optional ion deceleration arrangement 80.

Downstream of the ion trap 30 is a first modulator/deflector 100''' which directs the ions into the EST 40 from an off axis direction. Ions are reflected along the axis of the EST 40. To eject the ions from the EST 40 back to the ion trap 30, a second modulator/deflector 100'' in the EST 40 is employed. As an alternative to the directing of the ions from the ion trap 30 into the EST 40, the ions may instead be deflected by the deflector 100''' into an Orbitrap mass analyser 70 or the like.

The curved ion trap 30' comprises in the embodiment of FIG. 8, three adjoining segments 36,37,38. The first and third segments 36,38 each have an ion transport aperture so that ions are ejected from the ion trap 30' via the first transport aperture in the first segment 36, into the EST 40, but are received back into the ion trap 30' via a second, spatially separate transport aperture in the third segment 38. To achieve this, the same RF voltage may be applied to each segment of the ion trap 30' (so that in that sense the ion trap 30' acts as a single trap despite the several trap sections 36,37,38) but with different DC offsets applied to each section so that the ions are not distributed centrally in the axial direction of the curved ion trap 30'. In use, ions are stored in the ion trap 30'. By suitable adjustment of the DC voltage applied to the ion trap segments 36, 37, 38, ions are caused to leave the ion trap 30' via the first segment 36 for off axis injection into the EST 40. The ions return to the ion trap 30' and enter via the aperture in the third segment 38.

By maintaining the DC voltage on first and second segments 36 and 37 at a lower amplitude than the DC voltage applied to the third segment 38 when the ions are re-trapped from the EST 40, the ions can be accelerated (eg by 30-50 ev/kDa) along the curved axis of the ion trap 30' so that they undergo fragmentation. In this manner the ion trap 30' is operable both as a trap and as a fragmentation device.

The resultant fragment ions are then cooled and squeezed into the first segment 36 by increasing the DC offset voltage on the second and third segments 37, 38 relative to the voltage on the first segment 36.

For optimal operation, fragmentation devices in particular require that the spread of energies of the ions injected into them is well defined, for example with an accuracy of about 10-20 eV, since higher energies result in only low-mass fragments whereas lower energies provide little fragmentation. Many existing mass spectrometer arrangements, as well as the novel arrangements described in the embodiments of FIGS. 1 to 7 here, on the other hand, result in an energy spread of ions arriving at a fragmentation cell far in excess of that desirable narrow range. For example, in the arrangement of FIGS. 1 to 7, the ions may spread in energy in the ion trap 30, 30' due to spatial spread in that; due to space charge effects (e.g. Coulomb expansion during multiple reflections) in the EST 40, and due to the accumulated effect of aberrations in the system.

Figure 9:
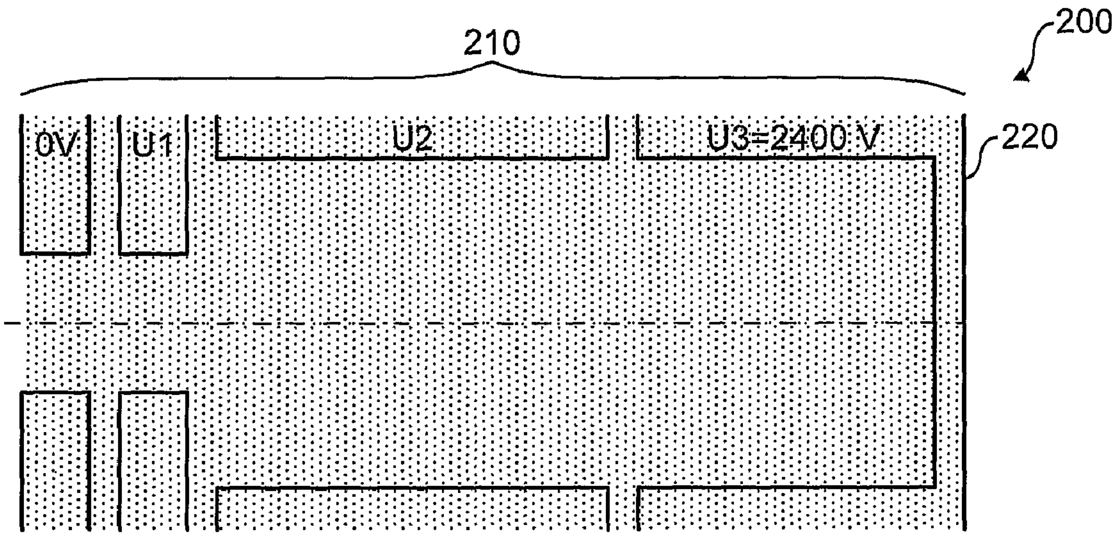
FIG. 9 shows an ion mirror arrangement for increasing energy dispersion of ions prior to injection into the fragmentation cell of FIGS. 1, 2, and 4-8.
Figure 10:
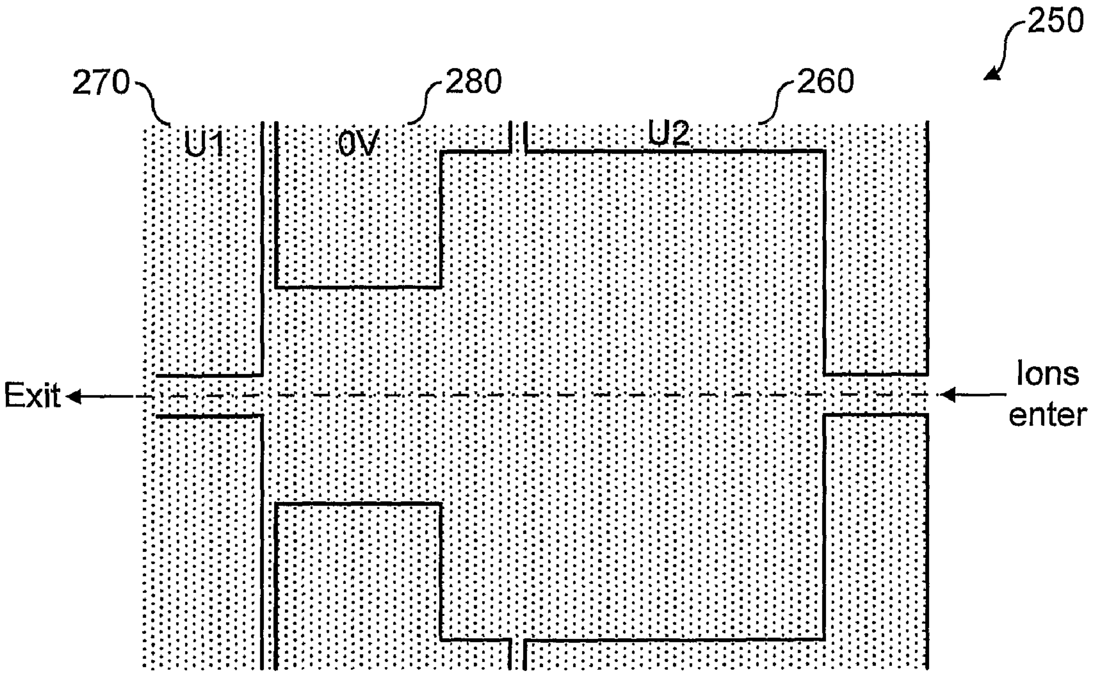
FIG. 10 shows a first embodiment of an ion deceleration arrangement for reducing energy spread prior to injection of ions into the fragmentation cell of FIGS. 1, 2, and 4-8.
Figure 11:
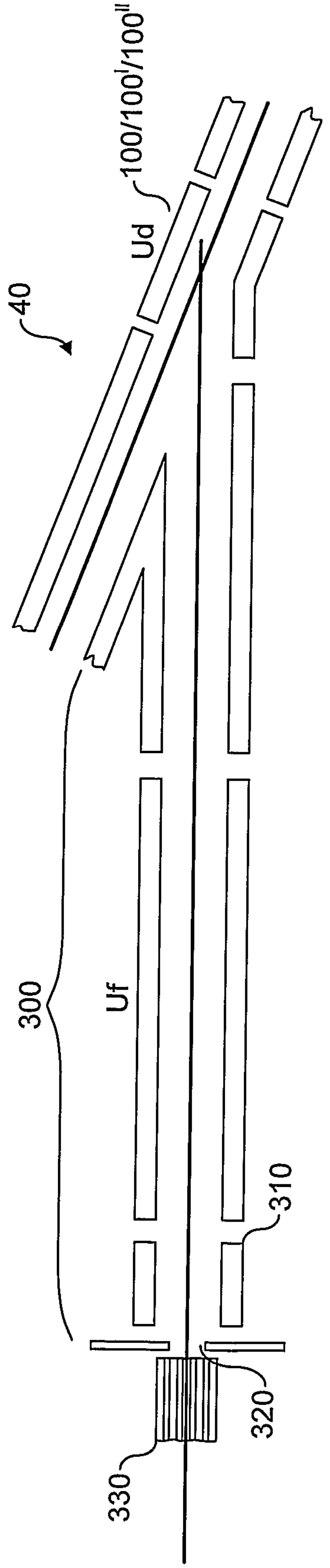
FIG. 11 shows a second embodiment of an ion deceleration arrangement for reducing energy spread prior to injection of ions into the fragmentation cell of FIGS. 1, 2, and 4-8.
Figure 12:
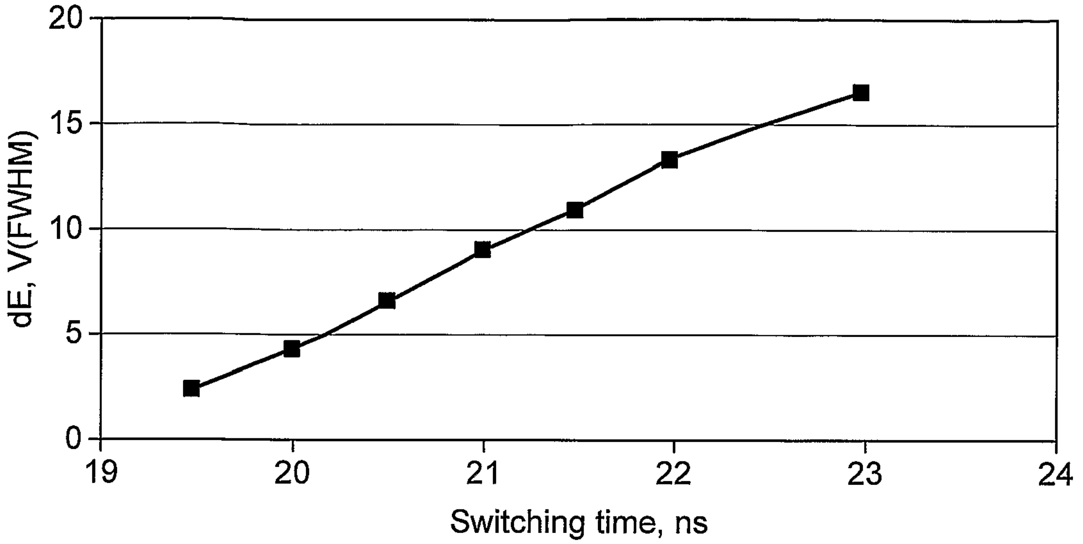
FIG. 12 shows a plot of energy spread of ions as a function of the switching time of a voltage applied to the ion deceleration arrangement of FIGS. 10 and 11.
Figure 13:
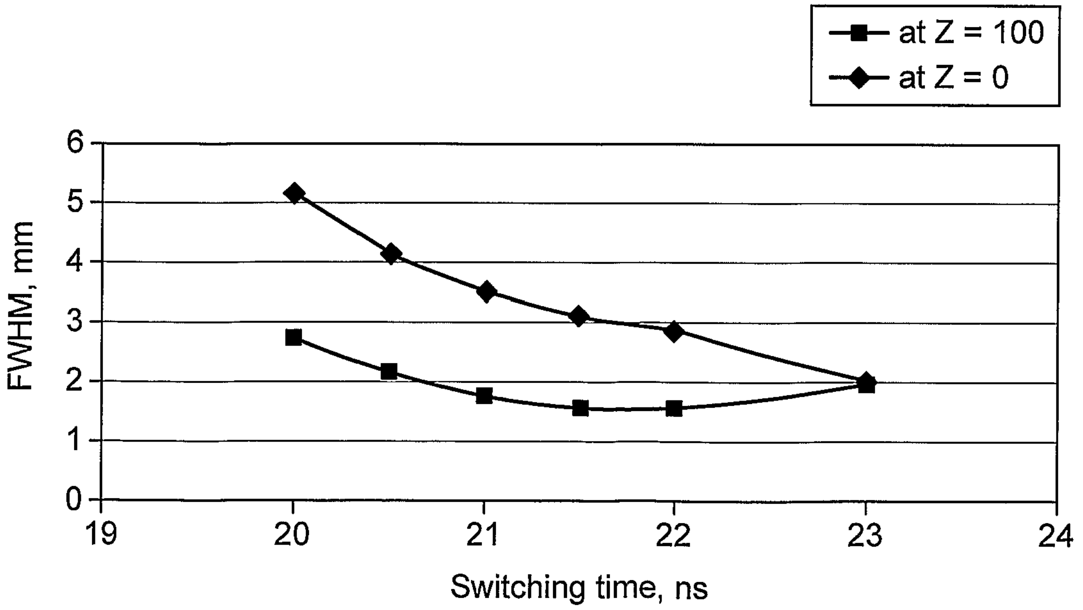
FIG. 13 shows a plot of spatial spread of ions as a function of the switching time of a voltage applied to the ion deceleration arrangement of FIGS. 10 and 11.

In consequence some form of energy compensation is desirable. FIGS. 9 to 11 show some specific but schematic examples of parts of an ion deceleration arrangement 80 for achieving that goal, and FIGS. 12 and 13 show energy spread reduction and spatial spread for a variety of different parameters applied to such ion deceleration arrangements.

In order to achieve a suitable level of energy compensation, it is desirable to increase the ion energy dispersion. In other words, the beam thickness for a hypothetical monoenergetic ion beam is preferably smaller than the separation of two such hypothetical monoenergetic ion beams by the desired energy difference of 10-20 eV as explained above. Although a degree of energy dispersion could of course be achieved by physically separating the fragmentation cell 50 from the ion trap 30 or EST 40 by a significant distance (so that the ions can disperse in time), such an arrangement is not preferred as it increases the overall size of the mass spectrometer, requires additional pumping, and so forth.

Instead it is preferable to include a specific arrangement to allow deliberate energy dispersion without unduly increasing the distance between the fragmentation cell 50 and the component of the mass spectrometer upstream from it (ion trap 30 or EST 40). FIG. 9 shows one suitable device. In FIG. 9, an ion mirror arrangement 200 forming an optional part of the highly schematically represented ion deceleration arrangement 80 of FIGS. 2-7 is shown. The ion mirror arrangement 200 comprises an array of electrodes 210 terminating in a flat mirror electrode 220. Ions are injected into the ion mirror arrangement from the EST 40 and are reflected by the flat mirror electrode 220 resulting in increased dispersion of the ions by the time they exit back out of the ion mirror arrangement and arrive at the fragmentation cell 50. An alternative approach to the introduction of energy dispersion is shown in FIG. 11 and described further below.

Once the degree of energy dispersion has been increased for example with the ion mirror arrangement 200 of FIG. 9, ions are next decelerated. In general terms this may be achieved by applying a pulsed DC voltage to a decelerating electrode arrangement such as that illustrated in FIG. 10 and labelled 250. The decelerating electrode arrangement 250 of FIG. 10 comprises an array of electrodes with an entrance electrode 260 and an exit electrode 270 between which is sandwiched a ground electrode 280. Preferably the entrance and exit electrodes are combined with differential pumping sections so as to reduce the pressure gradually between the (upstream) ion mirror arrangement 200 at a relatively low pressure, the decelerating electrode arrangement 250 at an intermediate pressure, and the relatively higher pressure required by the (downstream) fragmentation cell 50. By way of example only, the ion mirror arrangement 200 may be at a pressure of around $10^{-8}$ mBar, the decelerating electrode arrangement 250 may have a lower pressure limit of around $10^{-5}$ mBar rising to around $10^{-4}$ mBar via differential pumping, with a pressure in the range of $10^{-3}$ to $10^{-2}$ mBar or so in the fragmentation cell 50. To provide pumping between the exit of the decelerating electrode arrangement 250 and the fragmentation cell 50, an additional RF only multipole such as, most preferably, an octapole RF device, could be employed. This is shown in FIG. 11 to be described below.

To achieve deceleration, DC voltages on the lenses 260, 270 are switched under the control of a voltage controller (not shown). The time at which this occurs depends upon the specific mass to charge ratio of ions of interest. In particular, when ions enter a decelerating electric field, higher energy ions overtake lower energy ions and thus move to a greater depth in the deceleration field. After all the ions of this particular m/z enter the deceleration field, the field is switched off. Therefore ions with initially higher energy experience a higher drop in potential relatively to ground potential than the lower energy ions, thus making their energies equal. By matching the potential drop to the energy spread upon exit from the mass selector, a significant reduction of the energy spread may be achieved.

It will be understood that this technique permits energy compensation for a particular m/z, and not for a wide range of different mass to charge ratios. This is because only ions of a single mass to charge ratio will be caused to undergo an amount of deceleration that can be matched to their energy spread. Any ions of differing mass to charge ratios to that selected will of course likewise undergo a degree of deceleration but, having a different mass to charge ratio, the amount of deceleration will not then be balanced by the initial energy spread, i.e. the deceleration and penetration distance of higher energy ions will not then be matched to the deceleration and penetration distance of lower energy ions. Having said that, however, the skilled person will readily understand that this does not prohibit the introduction of ions of differing mass to charge ratios into the ion deceleration arrangement 80, only that only ions of one particular mass to charge ratio of interest will undergo the appropriate degree of energy compensation to prepare them properly for the fragmentation cell 50. Thus, the ions can either be filtered upstream of the ion deceleration arrangement 80 (so that only ions of a single mass to charge ratio of interest enter it in a given cycle of the mass spectrometer) or alternatively a mass filter can be employed downstream of the ion deceleration arrangement 80. Indeed, it is even possible to use the fragmentation cell 50 itself to discard ions not of the mass to charge ratio of interest and which have been suitably energy compensated.

FIG. 11 shows an alternative arrangement for decelerating ions and also optionally defocusing them as well. Here, the defocusing is achieved within the EST 40 (only a part of which is shown in FIG. 11) by pulsing the DC voltage on one of the electrostatic mirrors 42, 44 (FIG. 3) at a time when ions of a mass to charge ratio of interest are in the vicinity of that electrostatic mirror 42, 44 (because of the manner in which the EST 40 operates, the time at which ions of a particular m/z arrive at the electrostatic mirrors 42, 44 is known). Applying a suitable pulse to that electrostatic mirror 42 or 44 results in that mirror 42, 44 having a defocusing rather than a focusing effect on those ions.

Once defocused, the ions can then be ejected out of the EST by applying a suitable deflecting field to the deflector 100/100'/100". The defocused ions then travel towards a decelerating electrode arrangement 300 which decelerates ions of the selected m/z as explained above in connection with FIG. 10, by matching the initial energy spread to the drop in potential across the electric field defined by the decelerating electrode arrangement 300.

Finally, ions exit the decelerating electrode arrangement 300 through termination electrodes 310 and pass through an exit aperture 320 into an octapole RF only device 330 to provide the desirable pumping described above. The resultant output beam is more symmetrical than that of the arrangement of FIG. 10.

FIGS. 12 and 13 show plots of energy spread and spatial spread of ions of a specific mass to charge ratio, respectively, as a function of switching time of the DC voltage applied to the ion decelerating electrodes.

It can be seen from FIG. 12 that the reduction in energy spread achieved by an embodiment of the present invention can be as much as a factor of 20, reducing a beam with +/−50 eV spread to one of +/−2.4 eV. A longer switching time produces a smaller spatial spot size but a larger final energy spread with the particular decelerator system described here. The example is given here to show that beam characteristics other than energy spread must be considered, not to suggest that deceleration for optimal final energy spread always produces an increase in spatial spread of the final beam.

Other designs of decelerating lens used with other energy defocused beams could produce a still greater reduction in energy spread. Those skilled in the art will realise that there are many potential uses for the invention as a result. The use for which the invention was particularly addressed was that of improving the yield and type of fragment ions produced in a fragmentation process. As was noted earlier, for efficient fragmentation of parent ions, 10-20 eV ion energies are required, and clearly a great many ions in a beam having +/−50 eV energy spreads will be well outside that range. Ions having too high an energy predominantly fragment to low mass fragments which can make identification of the parent ion difficult, whilst a higher proportion of ions of low energy do not fragment at all. Without energy compensation, a parent ion beam having +/−50 eV energy spread directed towards a fragmentation cell would either produce a high abundance of low mass fragments, if all the beam were allowed to enter the fragmentation cell, or if only ions having the highest 20 eV of energy were allowed to enter (by use of a potential barrier prior to entry, for example) a great many ions would have been lost, and the process would be highly inefficient. The inefficiency would depend upon the energy distribution of the ions in the beam, with perhaps 90% of the beam being lost or unable to fragment due to insufficient ion energy.

By using the foregoing techniques, fragmentation of ions in the fragmentation cell may thereby be avoided if it is desired to pass ions through the fragmentation cell 50 (or store them there) in a given cycle of the mass spectrometer intact. Alternatively, control over the fragmentation may be improved when it is desired to carry out MS/MS or MS^n experiments.

Other uses for the ion deceleration technique described may be found in other ion processing techniques. Many ion optical devices can only function well with ions having energies within a limited energy range. Examples include electrostatic lenses, in which chromatic aberrations cause defocusing, RF multipoles or quadrupole mass filters in which the number of RF cycles experienced by the ions as they travel the finite length of the device is a function of the ion energy, and magnetic optics which disperse in both mass and energy. Reflectors are typically designed to provide energy focusing so as to compensate for a range of ion beam energies, but higher order energy aberrations usually exist and an energy compensated beam such as is provided by the present invention will reduce the defocusing effect of those aberrations. Again, those skilled in the art will realise that these are only a selection of possible uses for the described technique.

Returning now to the arrangements of FIGS. 2 and 4-8, in general terms, effective operation of each of the gas-filled units shown in these Figures depends upon the optimum choice of collision conditions and is characterised by collision thickness P·D, where P is the gas pressure and D is the gas thickness traversed by ions (typically, D is the length of the unit). Nitrogen, helium or argon are examples of collision gases. In the presently preferred embodiment, it is desirable that the following conditions are approximately achieved:

In the pre-trap 24, it is desirable that P·D>0.05 mm·torr, but is preferably <0.2 mm·torr. Multiple passes may be used to trap ions, as described in our co-pending Patent Application No. GB0506287.2.

The ion trap 30 preferably has a P·D range of between 0.02 and 0.1 mm torr, and this device could also extensively use multiple passes.

The fragmentation cell 50 (using collision-induced dissociation, CID) has a collision thickness P·D>0.5 mm torr and preferably above 1 mm·torr.

For any auxiliary ion storage device 60 employed, the collision thickness P·D is preferably between 0.02 and 0.2 mm·torr. On the contrary, it is desirable that the electrostatic trap 40 is sustained at high vacuum, preferably at or better than $10^{-8}$ torr.

The typical analysis times in the arrangement of FIG. 2 are as follows:

Storage in the pre-trap 24: typically 1-100 ms; Transfer into the curved trap 30: typically 3-10 ms;

Analysis in the EST 40: typically 1-10 ms, in order to provide selection mass resolution in excess of 10,000;

Fragmentation in the fragmentation cell 50, followed by ion transfer back into the curved trap 30: typically 5-20 ms;

Transfer through the fragmentation cell 50 into a second ion storage device 60, if employed, without fragmentation: typically 5-10 ms; and Analysis in a mass analyser 70 of the Orbitrap type: typically 50-2,000 ms.

Generally, the duration of a pulse for ions of the same m/z should be well below 1 ms, preferably below 10 microseconds, while a most preferable regime corresponds to ion pulses shorter than 0.5 microseconds (for m/z between about 400 and 2000). In alternative terms and for other m/z, the spatial length of the emitted pulse should be well below 10 m, and preferably below 50 mm, while a most preferable regime corresponds to ion pulses shorter than 5-10 mm. It is particularly desirable to employ pulses shorter than 5-10 mm when employing Orbitrap and multi-reflection TOF analysers.

Although some specific embodiments have been described, the skilled reader will readily appreciate that various modifications could be contemplated.

What is claimed is:

1. A method of reducing the energy spread of ions over a specific and limited mass to charge ratio range, the method comprising the steps of:

(a) generating an electric field having an electric field strength E using a deceleration electrode arrangement;

(b) directing ions of the mass to charge ratio range, having a spread of energies, into the decelerating electric field generated by the deceleration electrode arrangement; and (c) removing the decelerating electric field at a time t, once substantially all of the ions of the specific mass to charge ratio range have entered the decelerating electric field;

wherein the electric field strength E is matched to the energy spread of the ions upon entry into the electric field so as to reduce the energy spread of the said ions.

2. The method of claim 1, further comprising, prior to the step (b) of directing ions into the decelerating electric field, the step of:

dispersing the ions in energy.

3. The method of claim 2, wherein the step of dispersing the ions in energy comprises directing the ions into an ion mirror arrangement, reflecting the ions off an ion mirror within the ion mirror arrangement, and directing the ions back out of the ion mirror arrangement.

4. The method of claim 2, wherein the step of dispersing the ions in energy comprises directing the ions along an elongated flight path.

5. The method of claim 1, further comprising differentially pumping across the deceleration electrode arrangement such that the pressure at an entrance thereto is different to a pressure at an exit thereof.

6. The method of claim 1, further comprising ejecting ions from an ion optical device or a mass analysing device prior to directing them into the decelerating electric field.

7. The method of claim 6, wherein the ion optical device or mass analysing device includes a device adapted to eject ions of different mass to charge ratios at different times.

8. The method of claim 7, wherein the ion optical device or mass analysing device is selected from a group consisting of an electrostatic trap (EST); an Orbitrap operating in resonant ejection mode; a three dimensional (3D) trap; a linear trap with radial ejection; a linear trap with axial ejection; and a time-of-flight mass spectrometer.

9. The method of claim 1 further comprising directing the ions whose energy spreads have been reduced into a fragmentation or collision cell.

10. The method of claim 1 further comprising directing the ions whose energy spreads have been reduced into at least one of: an electrostatic lens, a multipole, a magnetic lens, a magnetic sector, an electrostatic sector, a quadrupole mass filter, a reflector, a time-of-flight mass spectrometer, an electrostatic trap, or a 3D trap.

11. The method of claim 1, wherein the step of switching off the field after a time period t comprises switching off the field in a time of about 25 nanoseconds or shorter.

12. The method of claim 11, wherein the step of switching off the field after a time period t comprises switching off the field in a time of between 19 and 25 nanoseconds.

13. The arrangement of claim 11, wherein the deceleration electrode arrangement is located within a differentially pumped housing.

14. The arrangement of claim 13, further comprising a multipolar RF device downstream of the deceleration electrode arrangement.

15. The arrangement of claim 14, wherein the multipolar RF device is an octapole RF only device.

16. The arrangement of claim 11, further comprising an ion selection device located upstream of the deceleration electrode arrangement.

17. The arrangement of claim 16, wherein the ion selection device is selected from a group consisting of an electrostatic trap (EST), an orbitrap, a 3D ion trap, a linear ion trap with radial ejection, a linear trap with axial ejection, and a time-of-flight mass spectrometer.

18. The arrangement of claim 11, further comprising a fragmentation or collision cell downstream of the deceleration electrode.

19. An ion deceleration arrangement for reducing the energy spread of ions over a specific but limited mass to charge ratio range, comprising:

a deceleration electrode arrangement for generating an electric field having an electric field strength E, the deceleration electrode arrangement including one or more deceleration electrodes;

a voltage supply for supplying a voltage to the said one or more deceleration electrodes; and a voltage controller configured to switch the voltage supply so as to remove the decelerating electric field at a time t after the introduction of ions of the mass to charge ratio range, having a spread of energies, into the decelerating electric field generated by the deceleration electrode arrangement and once substantially all of the ions of the specific mass to charge ratio range have entered the decelerating electric field;

wherein the controller and/or the voltage supply are configured to produce an electric field strength E which is matched to the energy spread of the ions upon entry into the electric field so as to reduce the energy spread of the said ions.

20. The arrangement of claim 19, further comprising an ion energy dispersion device located upstream of the ion deceleration arrangement.

21. The arrangement of claim 20, wherein the ion energy dispersion device comprises an ion mirror assembly, having an ion mirror for reflecting ions received into the ion mirror assembly back out of it.

22. The arrangement of claim 20, wherein the ion energy dispersion device comprises an elongated flight path.

* * * * *